United States Patent [19]

Uno et al.

[11] Patent Number: 4,813,339
[45] Date of Patent: Mar. 21, 1989

[54] PULSE-WIDTH-MODULATION CONTROL OF PARALLEL THREE-WAY VALVES TO SUPPLY SINGLE-ACTING QUICK-RESPONSE ACTUATOR

[75] Inventors: Motoo Uno; Ikuo Takeuchi; Kazuo Honma; Akihiko Sakai, all of Ibaraki, Japan

[73] Assignee: Hitachi, Ltd., Tokyo, Japan

[21] Appl. No.: 795,462

[22] Filed: Nov. 6, 1985

[30] Foreign Application Priority Data

Nov. 9, 1984 [JP] Japan ................... 59-234966

[51] Int. Cl.$^4$ ............... G05D 16/20; G05D 3/18; F15B 9/09
[52] U.S. Cl. ............................. 91/459; 91/28; 91/443; 91/DIG. 1; 318/599; 318/645; 307/265
[58] Field of Search ............. 91/28, 29, 48, 275, 91/361, 390, 429, 430, 443, DIG. 1, 459; 318/599, 645, 481; 307/261, 265-267, 513

[56] References Cited

U.S. PATENT DOCUMENTS

| | | | |
|---|---|---|---|
| 2,731,952 | 1/1956 | Szabo | 91/459 X |
| 3,454,101 | 7/1969 | Breitbarth et al. | 91/459 X |
| 3,488,999 | 1/1970 | Catania | 91/275 X |
| 3,516,331 | 6/1970 | Oelrich et al. | 91/459 X |
| 3,610,952 | 10/1971 | Chandos | 307/261 X |
| 3,618,469 | 11/1971 | Wills et al. | 91/361 |
| 3,768,373 | 10/1973 | Divigard | 91/459 X |
| 3,874,407 | 4/1975 | Griswold | 91/459 X |
| 4,041,894 | 8/1977 | Kimmich | 307/261 X |
| 4,063,143 | 12/1977 | Forstbauer | 363/72 X |
| 4,131,325 | 12/1978 | Bayliss | 303/93 |
| 4,203,395 | 5/1980 | Cromas et al. | 123/339 |
| 4,205,593 | 6/1980 | Sakakibara | 91/459 |
| 4,253,480 | 3/1981 | Kessel et al. | 137/487.5 X |
| 4,258,749 | 3/1981 | Mayer | 137/881 X |
| 4,273,028 | 6/1981 | Turnwald et al. | 91/275 |
| 4,281,584 | 8/1981 | Onken et al. | 91/459 X |
| 4,336,743 | 1/1983 | Leszczewski | 91/363 R |
| 4,370,714 | 1/1983 | Rettich et al. | 303/20 X |
| 4,498,138 | 2/1985 | Moore | 307/261 X |
| 4,539,967 | 9/1985 | Nakajima et al. | 91/361 X |
| 4,587,883 | 5/1986 | Ehrentraut et al. | 91/361 X |
| 4,628,499 | 12/1986 | Hammett | 91/361 X |

FOREIGN PATENT DOCUMENTS

| | | | |
|---|---|---|---|
| 0038128 | 10/1981 | European Pat. Off. | 91/459 |
| 2417666 | 1/1975 | Fed. Rep. of Germany | 91/450 |
| 3302403 | 7/1984 | Fed. Rep. of Germany | 91/459 |
| 7714476 | 7/1979 | Sweden | 91/459 |
| 1330176 | 9/1973 | United Kingdom | 318/599 |

Primary Examiner—Robert E. Garrett
Assistant Examiner—George Kapsalas
Attorney, Agent, or Firm—Antonelli, Terry & Wands

[57] ABSTRACT

Parallel, pulse-width-modulation controlled three-way valves each both supply and exhaust a pressure chamber of a fluid actuator. The phase difference of the oscillator carrier waves of the pulse width modulation input circuit effectively increases the frequency of a net actuator carrier wave so as to quicken the response of the actuator.

29 Claims, 4 Drawing Sheets

PULSE-WIDTH-MODULATION CONTROL OF PARALLEL THREE-WAY VALVES TO SUPPLY SINGLE-ACTING QUICK-RESPONSE ACTUATOR

BACKGROUND OF THE INVENTION

The present invention relates to a control apparatus for an actuator, and, more particularly, to a control apparatus for an actuator which is operated by controlling fluid compression.

In accordance with one known type of actuator which is operated by compressing fluid, there consists, for example, a single acting type fluid pressure cylinder wherein fluid pressure acts on one side of a piston and wherein the piston is returned by its own weight or a load or spring force. An example of means to control the feed of the fluid pressure with respect to the single acting type fluid pressure cylinder employs a three-way valve as described in the publication 'Fluid Power Control' published in the U.S. in 1960, pp. 527–540. Regarding this, in a case where an actuator that is provided with an actuator driver having a long rise time or dead time is driven by a pulse width modulated control system, for example, in a case where an actuator such as single acting type air cylinder is driven according to the pulse width modulation control by an actuator driver such as proportional valve or solenoid valve, the period of a carrier wave must be several times longer than the response of the actuator driver. This has led to the problem where the responsiveness of the actuator to an input signal worsens drastically.

SUMMARY OF THE INVENTION

An object of the present invention is to provide a control apparatus for an actuator which can result in enhancing the speed of the controlled response.

The present invention for accomplishing the object consists of a control apparatus for an actuator wherein a driver for the actuator is controlled in accordance with an error signal between a pressure reference signal and a pressure feedback signal of the actuator and wherein an operation of the actuator is controlled by a compressed fluid from the actuator driver, in a control apparatus for an actuator comprising a plurality of drivers for the actuator which are connected to the actuator in parallel with each other, a pressure reference signal generator which outputs a reference voltage signal corresponding to a pressure reference signal, a pressure sensor which detects a pressure of the actuator to output a pressure signal, an operational amplifier which produces an error voltage signal based on the difference between the reference voltage signal from said pressure reference signal generator and the pressure signal from said pressure sensor, an oscillator which outputs carrier wave signals corresponding to the actuator drivers, with a phase shift therebetween, and pulse width modulation circuits which respectively supply said actuator drivers with pulse trains having duty ratios proportional to the error voltage, on the basis of the corresponding carrier wave signals from said oscillator and the error voltage signal from said operational amplifier, whereby a frequency of a carrier wave is equivalently raised for the actuator so as to control it with quick response.

Other objects, features and advantages of the present invention will become apparent from the following description of embodiments.

DETAILED DESCRIPTION OF THE PREFERRED EMBODIMENTS

Embodiments of the present invention will be described with reference to the drawings.

Figure 1:
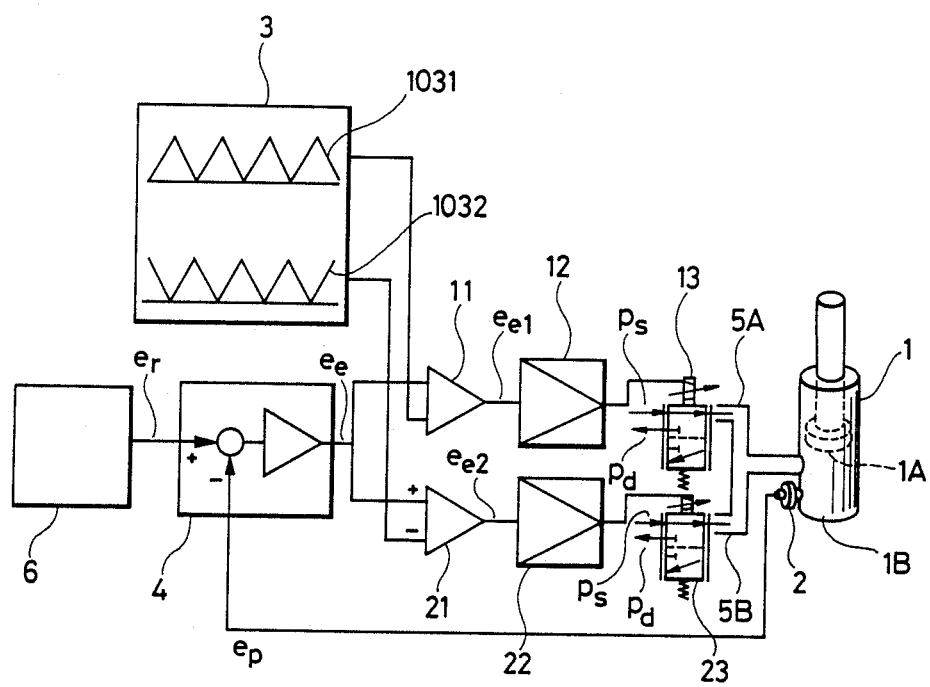
FIG. 1 is a circuit arrangement diagram of an aspect of performance of an apparatus according to the present invention.

FIG. 1 shows one embodiment of a control apparatus for an actuator according to the present invention. Referring to the figure, the actuator 1 is a single acting cylinder in which a fluid pressure acts on a fluid chamber 1B located on one side of a piston 1A. Branched pipe lines 5A and 5B are connected to the fluid chamber 1B of the actuator 1. These branched pipe lines 5A and 5B are respectively provided with control valves 13 and 23 for controlling fluid pressures $P_s$ from a fluid pressure source. By way of example, the control valves 13 and 23 are ON-OFF type three-way valves. The actuator 1 is furnished with a pressure sensor 2 for detecting a pressure in the fluid chamber 1B. A pressure reference signal generator 6 outputs a reference voltage $e_r$ corresponding to a pressure reference signal. An operational amplifier 4 produces an error voltage $e_e$ which is proportional to the difference between the reference voltage $e_r$ and an output $e_p$ from the pressure sensor 2. An oscillator 3 outputs triangular wave signals 1031 and 1032 which are carrier wave signals having a phase shift of 180 degrees therebetween. A comparator 11, corresponding a pulse width modulation circuit, generates a pulse train $e_{e1}$ having a duty ratio proportional to the error voltage $e_e$ on the basis of the triangular wave signal 1031 from the oscillator 3 and the error voltage $e_e$ from the operational amplifier 4, while a comparator 21 generates a pulse train $e_{e2}$ having a duty ratio proportional to the error voltage $e_e$ on the basis of the triangular wave signal 1032 from the oscillator 3 and the error voltage $e_e$ from the operational amplifier 4. Power amplifiers 12 and 22 control the control valves 13 and 23 ON and OFF in accordance with the pulse trains $e_{e1}$ and $e_{e2}$ from the comparators 11 and 21, respectively.

Next, the operation of the above embodiment of the apparatus of the present invention will be described.

The oscillator 3 generates the triangular wave signals 1031 and 1032 as carrier wave signals having a relative phase shift of 180 degrees with respect to each other, and it inputs them to the comparators 11 and 21 as reference signals, respectively. The operational amplifier 4 operates the error voltage $e_e$ which is proportional to the difference between the voltage $e_r$ of the pressure reference signal generator 6 corresponding to the pressure reference signal and the output $e_p$ of the pressure sensor 2, and it inputs the operated error voltage to the comparators 11 and 21. These comparators 11 and 21 compare the carrier wave signals 1031 and 1032 with the error voltage respectively, to generate the pulse trains $e_{e1}$ and $e_{e2}$ which have the duty ratios proportional to the error voltage $e_e$ and which turn ON and OFF the control valves 13 and 23 through the power amplifiers 12 and 22.

Figure 2:
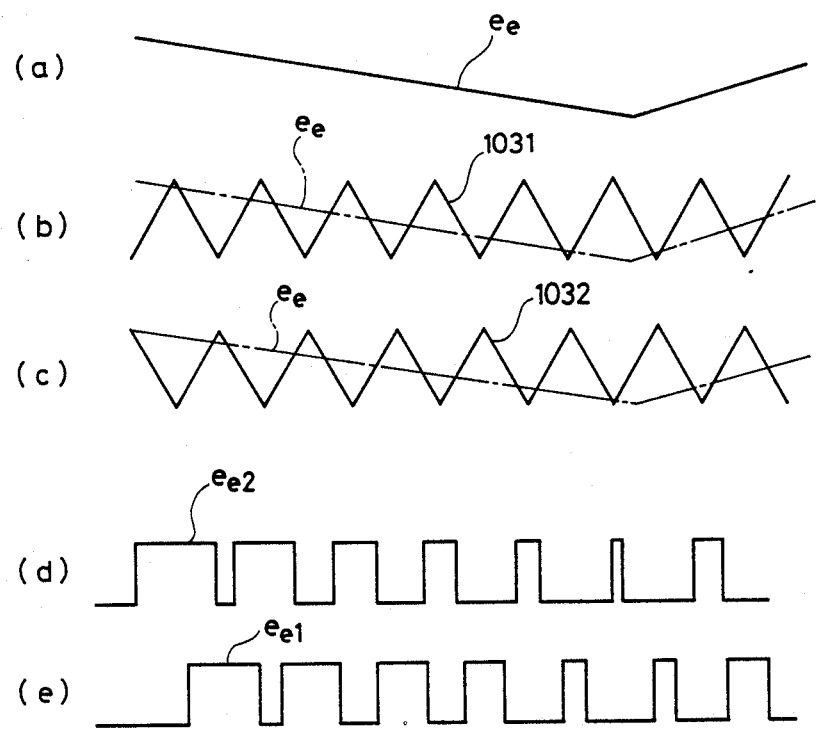
FIG. 2 is a diagram showing the signal waveforms of portions in an embodiment of the apparatus of the present invention shown in FIG. 1.

Examples of waveforms of the respective voltages in the above operation are shown in FIG. 2. In this figure, (a) illustrates the error voltage $e_e$, and (b) and (c) illustrate the carrier wave signals 1031 and 1032 in each of which the error voltage $e_e$ is depicted by a dot-and-dash line to clarify the corresponding relation. (d) and (e) illustrate the outputs $e_{e1}$ and $e_{e2}$ of the comparators 11 and 21.

Owing to the arrangement stated above, the control valves 13 and 23 are individually controlled by the carrier waves having the phase shift from the pulse width modulation circuits. The effective opening ratio of the control valve 13 or 23 is proportional to the duty ratio of the pulse train $e_{e1}$ or $e_{e2}$ corresponding to the output of the pulse width modulation circuit, and is updated every cycle of the corresponding carrier wave signal 1031 and 1032. Thus, an effective opening ratio for the actuator 1 becomes the sum between the effective opening ratios of both the control valves 13 and 23. More specifically, in case of driving the actuator with a single control valve, only a responsibility longer than the cycle of a carrier wave signal can be attained. In contrast, the control valves 13 and 23 which are actuated by the carrier waves having the phase shift can equivalently raise the frequency of a carrier wave for the actuator 1 and enhance the responsibility of the control thereof.

Figure 3:
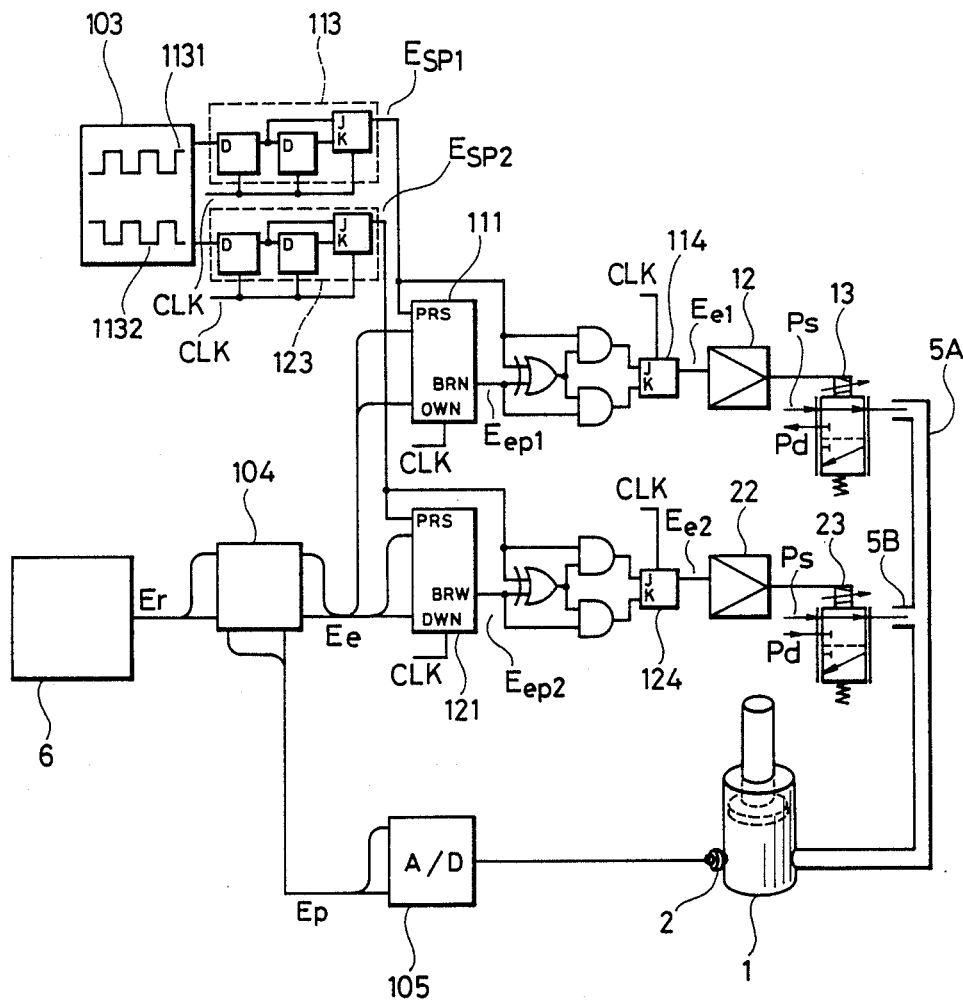
FIG. 3 is a circuit arrangement diagram of another embodiment of the apparatus of the present invention.

FIG. 3 shows another embodiment illustrative of the practicable arrangement of the apparatus of the present invention, in which the same portions as in FIG. 1 are indicated by identical symbols. Numeral 103 designates a pulse width modulation input circuit, numeral 104 a digital subtractor, numeral 105 and A/D converter, and numerals 111 and 121 decrement counters. The pulse width modulation input circuit 103 outputs rectangular wave signals 1131 and 1132 which are carrier wave signals having a phase shift of 180 degrees therebetween, and which are respectively applied to pulse generator circuits 113 and 123 to produce pulses $E_{sp1}$ and $E_{sp2}$ synchronous with the rising edges of the rectangular waves. The respective pulses $E_{sp1}$ and $E_{sp2}$ preset the counters 111 and 121, and simultaneously set flip-flops 114 and 124. The error value $E_e$ between a pressure feedback value $E_p$ and a reference value $E_r$, namely, the output of the subtractor 104 preset in the counters 111 and 121 is immediately counted down according to a clock, to reset the flip-flops 114 and 124 simultaneously with the generation of borrow pulses. That is, the outputs $e_{e1}$ and $E_{e2}$ of the flip-flops 114 and 124 become pulse trains whose widths are proportional to the error $E_e$ and which turn ON and OFF the control valves 13 and 23 through the power amplifiers 12 and 22.

Figure 4:
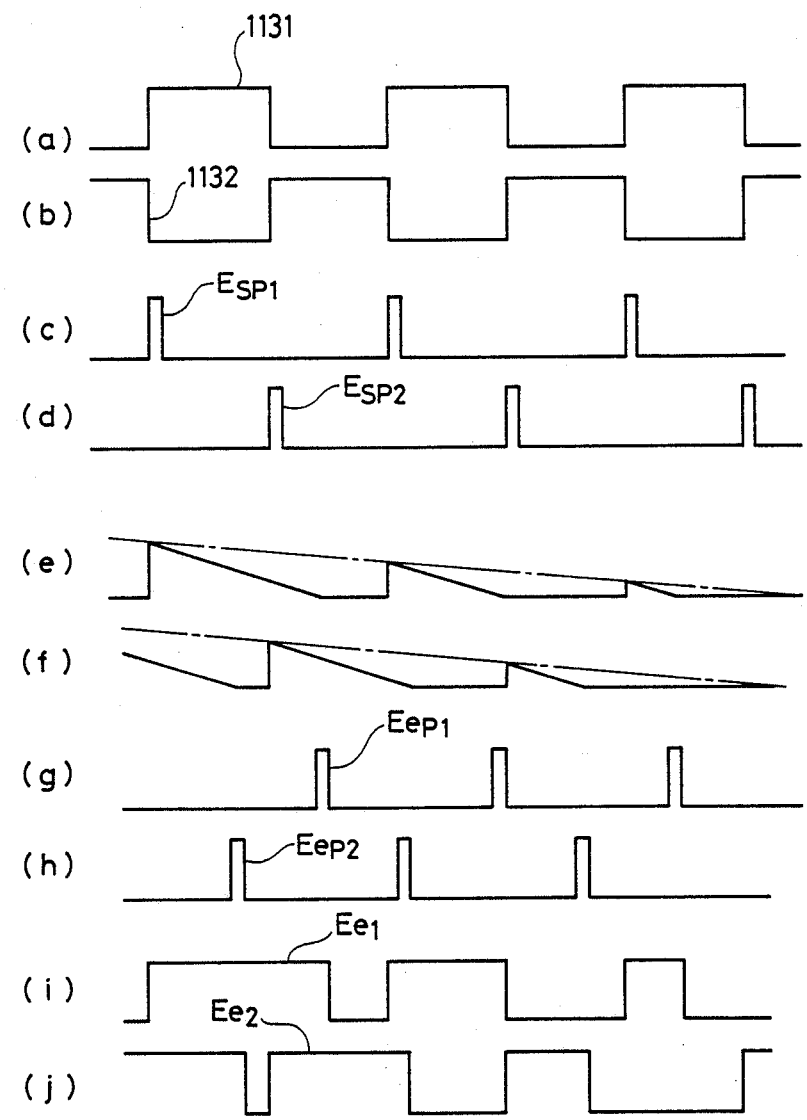
FIG. 4 is a diagram showing the signal waveforms of portions in another embodiment of the apparatus of the present invention shown in FIG. 3.

FIG. 4 shows examples of waveforms of the signals at the various parts stated above. In the figure, (a) and (b) illustrate the rectangular waves 1131 and 1132 generated by the pulse width modulation input circuit 103, and (c) and (d) the pulses $E_{sp1}$ and $E_{sp2}$ which the pulse generator circuits 113 and 123 generate at the rising edges of the rectangular waves 1131 and 1132. The waveforms (e) and (f) illustrate the situations of countdown of the counters 111 and 121 in terms of analog quantities, in each of which a dot-and-dash line indicates the error $E_e$ that is preset in accordance with the pulses $E_{sp1}$ (c) and $E_{sp2}$ (d). Waveforms (g) and (h) illustrate the borrow pulses $E_{ep1}$ and $E_{ep2}$ which the counters 111 and 121 generate. Waveforms (i) and (j) illustrate the outputs $E_{e1}$ and $E_{e2}$ of the flip-flops 114 and 124 which are set by the set pulses $E_{sp1}$ (e) and $E_{sp2}$ (d) and reset by the borrow pulses $E_{ep1}$ (g) and $E_{ep2}$ (h).

Even when the apparatus is arranged as in this embodiment, an effect similar to that of the foregoing embodiment can be attained.

Although each of the above embodiments has illustrated the example in which the two control valves are arrayed in parallel, a similar effect can be produced also in case of arraying three or more control valves in such a way that driver circuits are disposed for the respective control valves, that the number of reference signals to be generated by an oscillator is equalized to the number of the control valves and that the magnitudes of phase shifts among the signals are made smaller. For example, when three control valves are employed, the pase difference between the adjacent ones of three carrier wave signals is set at 120 degrees.

Besides, although the embodiments are illustrative of an example in which the frequencies of the reference signals being generated by the oscillator are equal, a similar effect can be produced even with unequal frequencies.

Further, the actuator is not restricted to the single acting cylinder, but the invention is also applicable to an actuator made of an elastic cylindrical body. In addition, the control valves are not restricted to the ON-OFF type, but three-way valves of the proportional type may well be employed.

According to the present invention, the responsiveness of the operation control of an actuator of long rise time or dead time can be enhanced.

What is claimed is:

1. A control apparatus for an actuator responsive to fluid pressure therein including a plurality of actuator drivers connected to said actuator and controlled in accordance with an error voltage signal indicating the difference between a pressure reference signal and a pressure feedback signal of said actuator and wherein operation of said actuator is controlled by fluid pressure supplied thereto by said plurality of actuator drivers, comprising:

pressure reference signal generator means for providing a reference voltage signal corresponding to a pressure refrence;

pressure sensor means for providing a pressure signal based on the pressure in said actuator;

error voltage producing means, coupled to said pressure reference signal generator means and said pressure sensor means, for producing an error voltage signal as a function of the difference between the reference voltage signal from said pressure reference signal generator means and the pressure signal from said pressure sensor means;

oscillator means for generating a plurality of phase-shifted carrier wave signals corresponding in number to the number of said actuator dirvers; and pulse width modulation means, coupled to receive said plurality of carrier wave signals from said oscillator means and said error voltage signal from said error voltage producing means, for producing a plurality of trains of pulse signals corresponding to the number of said drivers, being respectively out-of-phase with each other with a relative phase difference dependent upon the relative phase difference of said carrier wave signals and each having a duty ratio proportional to said error voltage signal for respectively controlling each of said plurality of actuator drivers, whereby as a result of said plurality of actuator drivers being controllably actuated by said plurality of phase-shifted trains of pulse signals, there results in enhanced control of said actuator by effectively increasing the frequency of the carrier wave for said actuator.

2. A control apparatus for an actuator according to claim 1, wherein said control valves comprise three-way valves.

3. A control apparatus for an actuator according to claim 1, wherein said actuator comprises a single acting actuator including a fluid chamber and which operates in one direction in response to fluid pressure action in the fluid chamber.

4. A control apparatus for an actuator according to claim 3, wherein said plurality of actuator drivers comprise control valves which are respectively incorporated in branched pipelines connected in common to the fluid chamber of said actuator.

5. A control apparatus for an actuator according to claim 4, wherein respective ones of said trains of pulse signals are supplied to respective ones of said control valves via corresponding power amplifiers.

6. A control apparatus for an actuator according to claim 4, wherein said control valves comprise three-way valves.

7. A control apparatus for an actuator according to claim 4, wherein said plurality of phase-shifted carrier wave signals are pulse shaped waveforms and said pulse width modulation circuit means comprises a plurality of decrement counters and flip-flop circuits, corresponding in number to the number of said actuator drivers, wherein said decrement counters, responsive to said rectangular carrier wave signals and said error voltage signal, are connected to feed pulses generated therefrom to said flip-flop circuits, and said flip-flop circuits produce respective trains of pulse signals which are respectively phase-shifted and which have duty ratios proportional to said error voltage signal based on respective countdown magnitudes of said plurality of decrement counters.

8. A control apparatus for an actuator according to claim 7, wherein said error voltage producing means comprises a digital subtractor.

9. A control apparatus for an actuator according to claim 8, wherein respective ones of said trains of pulse signals supplied to respective ones of said control valves via corresponding power amplifiers.

10. A control apparatus for an actuator according to claim 4, wherein said plurality of phase-shifted carrier wave signals are triangular shaped waveforms and said pulse width modulation circuit means comprises a plurality of comparators, corresponding in number to the number of said actuator drivers for producing respective trains of phase-shfited pulse signals, each having respective duty ratio proportional to said error voltage signal, in response to a respective one of said triangular shaped carrier wave signals and said error voltage signal.

11. A control apparatus for an actuator according to claim 10, wherein said error voltage producing means comprises an operational amplifier.

12. A control apparatus for an actuator according to claim 11, wherein respective ones of said trains of pulse signals supplied to respective ones of said control valves via corresponding power amplifiers.

13. A control apparatus for an actuator according to claim 12, wherein said control valves comprise three-way valves.

14. A control apparatus for a single action actuator having a fluid chamber, including a plurality of control valves for operating the actuator and width are controlled in accordance with an error voltage signal producing means between a pressure reference signal and a pressure feedback signal corresponding to the pressure in said fluid chamber of the actuator and wherein operation of the actuator is controlled by fluid pressure in response to said plurality of control valves, comprising:
an oscillator for generating a plurality of phase-shifted carrier wave signals corresponding to the number of said control valves; and
a plurality of pulse width modulation circuits, responsive to said carrier wave signals and said error voltage signal, for outputting a plurality of phase-shifted trains of pulse signals having a relative phase difference dependent upon the relative phase difference of said plurality of carrier wave signals and being equal in number to the number of said control valves and each having a duty ratio proportional to said error voltage signal for respectively controlling each of said plurality of control valves, whereby as a result of said plurality of control valves being controllably actuated by said plurality of phase-shifted trains of pulse signals, there results in enhanced control of said actuator by effectively increasing the frequency of the carrier wave for said actuator.

15. A control apparatus for an actuator according to claim 14, wherein respective ones of said trains of pulse signals supplied to respective ones of said control valves via corresponding power amplifiers.

16. A control apparatus for an actuator according to claim 14, wherein said plurality of phase-shifted carrier wave signals are pulse shaped waveforms and said pulse width modulation circuit means comprises a plurality of decrement counters and flip-flop circuits, corresponding in number to the number of said control valves, wherein said decrement counters, responsive to said rectangular carrier wave signals and said error voltage signal, are connected to feed pulses generated therefrom to said flip-flop circuits, and said flip-flop circuits produce respective phase-shifted trains of pulse signals having respective duty ratios proportional to said error voltage signal based on respective countdown magnitudes of said plurality of decrement counters.

17. A control apparatus for an actuator according to claim 16, wherein respective ones of said trains of pulse signals are supplied to respective ones of said control valves via corresponding power amplifiers.

18. A control apparatus for an actuator according to claim 14, wherein said control valves comprise three-way valves.

19. A control apparatus for an actuator according to claim 18, wherein said plurality of three-way valves are respectively incorporated in branched pipelines connected in common to the fluid chamber of said actuator.

20. A control apparatus for an actuator according to claim 14, wherein said plurality of phase-shifted carrier wave signals consist of triangular shaped waveforms and said plurality of pulse width modulation circuits comprise a plurality of comparators, corresponding in number to the number of said control valves for producing respective trains of phase-shifted pulse signals, each having a duty ratio proportional to said error voltage signal, in response to a respective one of said triangular shaped carrier wave signals and said error voltage signal.

21. A control apparatus for an actuator according to claim 20, wherein said plurality of pulse width modulation circuits include a first comparator, responsive to said error voltage signal and a first of said plurality of carrier wave signals, supplying a first of said plurality of control valves with a respective first train of pulses having a duty ration proportional to said error voltage signal and a second comparator, responsive to said error voltage signal and a second of said plurality of carrier wave signals, supplying a second one of said plurality of control valves with a second train of pulses phase-shifted with respect to said first train of pulses and having a duty ratio proportional to said error voltage signal and being phase-shifted relative to said first train of pulses in dependence upon the relative phase difference of said first and second carrier wave signals.

22. A control apparatus for an actuator according to claim 21, wherein respective ones of said trains of pulses are supplied to respective ones of said control valves via corresponding power amplifiers.

23. A control apparatus for an actuator according to claim 22, wherein said first and second carrier wave signals having a relative phase shift of about 180°.

24. A control apparatus for an actuator according to claim 23, wherein said first and second control valves comprise first and second three-way valves, respectively.

25. A control apparatus for an actuator according to claim 24, wherein said first and second three-way valves are respectively incorporated in branched pipelines connected in common to the fluid chamber of said actuator.

26. A control apparatus for an actuator responsive to fluid pressure therein including a plurality of three-way valves connected to said actuator and controlled in accordance with an error voltage signal indicating the difference between a pressure reference signal and a pressure feedback signal of said actuator and wherein operation of said actuator is controlled by fluid pressure supplied thereto by said plurality of three-way valves, comprising:

pressure reference signal generator means for providing a reference voltage signal corresponding to a pressure reference;

pressure sensor means for providing a pressure signal based on the pressure in said actuator;

error voltage producing means, coupled to said pressure reference signal generator means and said pressure sensor means, for producing an error voltage signal as a function of the difference between the reference voltage signal from said pressure reference signal generator means and the pressure signal from said pressure sensor means;

oscillator means for generating a plurality of phase-shifted carrier wave signals corresponding in number to the number of said three-way control valves; and pulse width modulation means, coupled to receive said plurality of carrier wave signals from said oscillator means and said error voltage signal from said error voltage producing means, for producing a plurality of trains of pulse signals corresponding to the number of said three-way control valves, being respectively out-of-phase with each other and each having a duty ratio proportional to said error voltage signal for respectively controlling each of said plurality of three-way control valves, whereby as a result of said plurality of three-way control valves being controllably actuated by said plurality of phase-shifted trains of pulse signals, there results in enhanced control of said actuator by effectively increasing the frequency of the carrier wave for said actuator.

27. A control apparatus for an actuator according to claim 26, wherein said plurality of three-way control valves are respectively incorporated in branched pipelines connected in common to control the fluid pressure in said actuator.

28. A control apparatus for a single action actuator having a fluid chamber, including a plurality of three-way control valves for operating the actuator and which are controlled i n accordance with an error voltage signal producing means between a pressure reference signal and a pressure feedback signal corresponding to the pressure in said fluid chamber of the actuator and wherein operation of the actuator is controlled by fluid pressure in response to said plurality of three-way control valves, comprising:

an oscillator for generating a plurality of phase-shifted carrier wave signals corresponding to the number of said control valves; and a plurality of pulse width modulation circuits, responsive to said carrier wave signals and said error voltage signal, for outputting a plurality of phase-shifted trains of pulse signals equal in number to the number of said three-way control valves and each having a duty ratio proportional to said error voltage signal for respectively controlling each of said plurality of three-way control valves, whereby as a result of said plurality of three-way valves being controllably actuated by said plurality of phase-shifted trains of pulse signals, there results in enhanced control of said actuator by effectively increasing the frequency of the carrier wave for said actuator.

29. A control apparatus for an actuator according to claim 28, wherein said plurality of three-way valves are respectively incorporated in branched pipelines connected in common to the fluid chamber of said actuator.

* * * * *